Nov. 11, 1952  V. GENTILE, JR  2,617,301
FLOW TUBE DIFFERENTIAL PRESSURE PRODUCER
Filed May 11, 1949  3 Sheets-Sheet 1
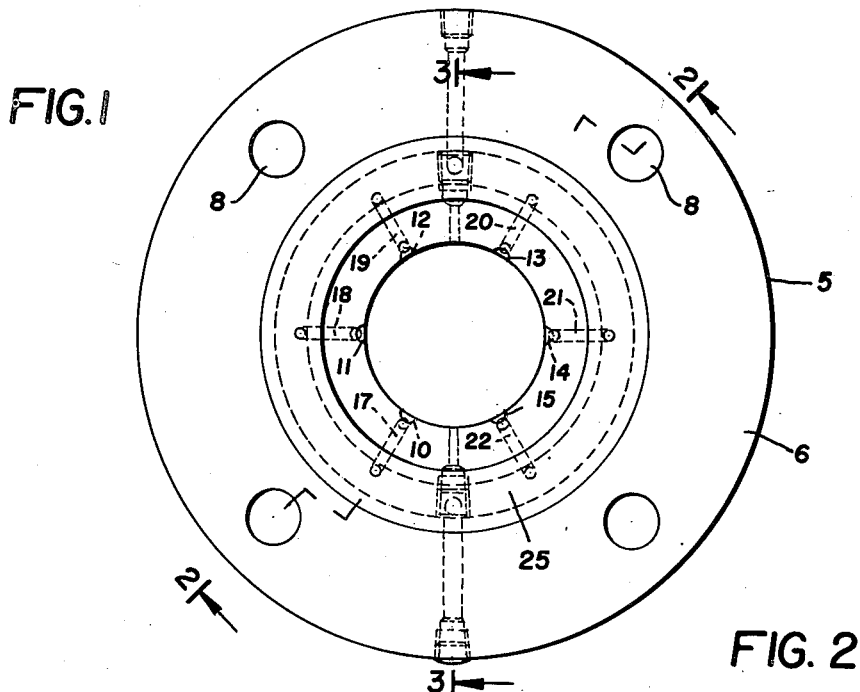
FIG. 1
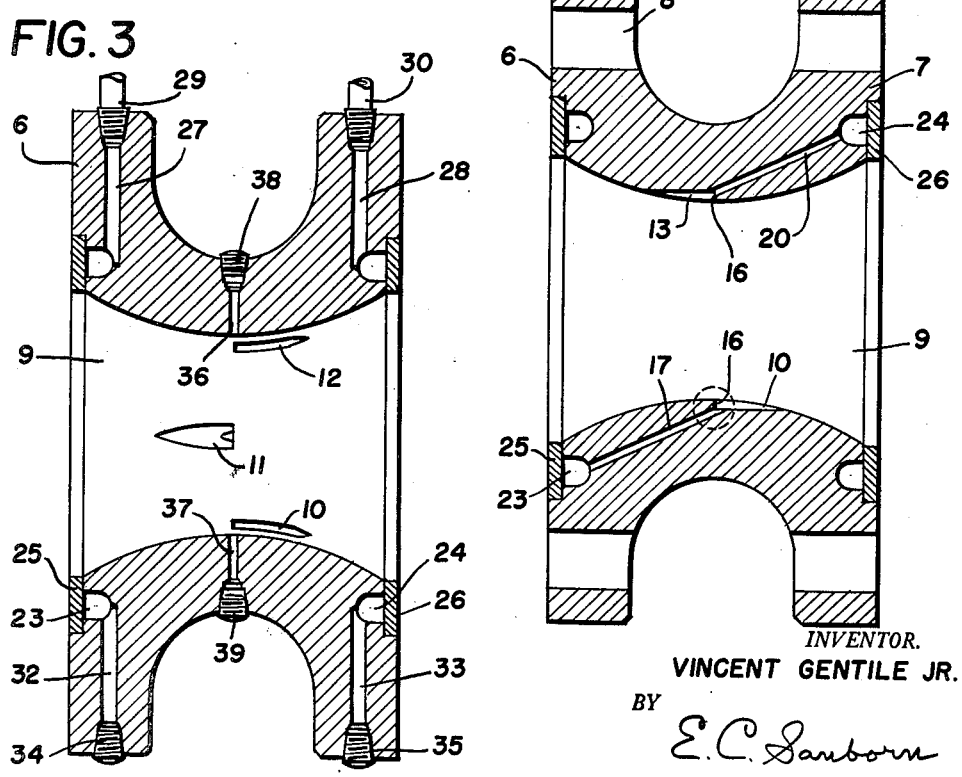
FIG. 2
FIG. 3
INVENTOR.
VINCENT GENTILE JR.
BY
E. C. Sanborn
ATTORNEY.

Nov. 11, 1952 — V. GENTILE, JR — 2,617,301
FLOW TUBE DIFFERENTIAL PRESSURE PRODUCER
Filed May 11, 1949 — 3 Sheets-Sheet 2

INVENTOR.
VINCENT GENTILE JR.
BY E.C. Sanborn
ATTORNEY.

Nov. 11, 1952  V. GENTILE, JR  2,617,301
FLOW TUBE DIFFERENTIAL PRESSURE PRODUCER
Filed May 11, 1949  3 Sheets-Sheet 3
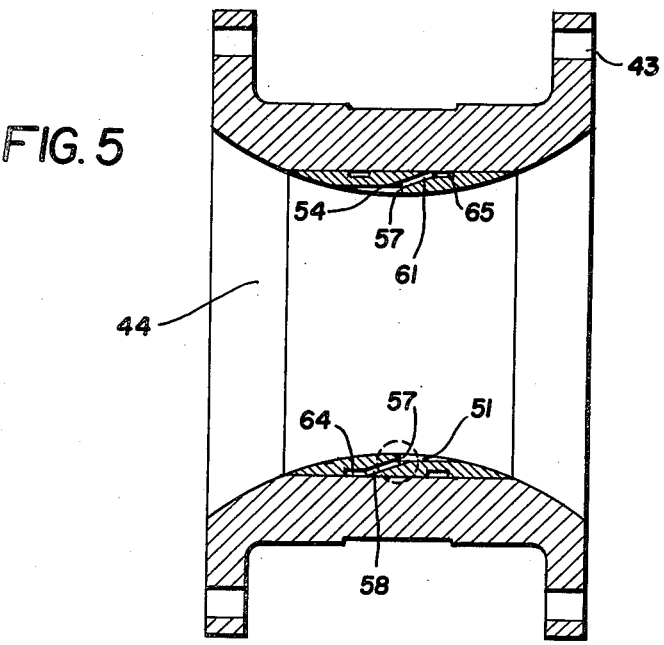
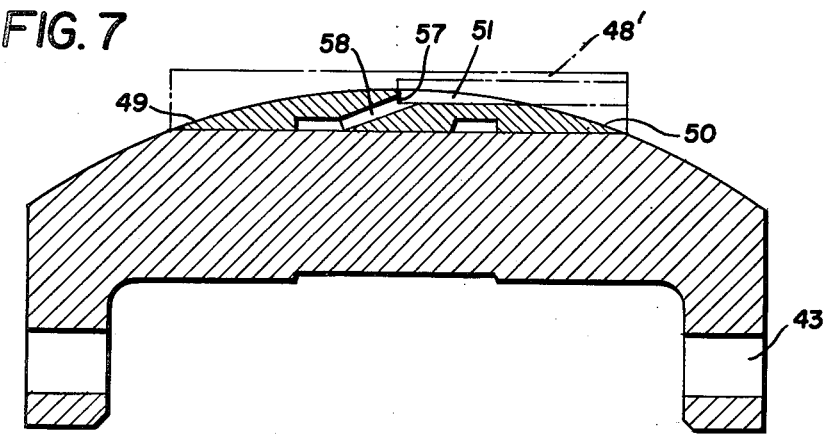
INVENTOR.
VINCENT GENTILE JR.
BY
E. C. Sanborn
ATTORNEY.

Patented Nov. 11, 1952

2,617,301

UNITED STATES PATENT OFFICE 2,617,301

FLOW TUBE DIFFERENTIAL PRESSURE PRODUCER

Vincent Gentile, Jr., Brooklyn, N. Y.

Application May 11, 1949, Serial No. 92,527

5 Claims. (Cl. 73—272)

1

This invention relates to devices for producing differential pressures proportional to the velocity or quantity rate of flow of a liquid, vapor or gaseous medium.

In my Patent No. 2,260,019, issued October 21, 1941, I have disclosed a flow tube having groups of nozzles closely adjacent to the inner surfaces of the tube and facing in opposite directions for measuring the flow rate or velocity of fluids, and presenting distinct advantages over Venturi tubes, as pointed out in said patent.

The present invention provides a new and improved flow tube having novel features which contribute to increased accuracy and efficiency over a wide range of fluid-velocity measurements, and capable of production with marked facility and economy.

A feature of the invention comprises a flow tube having a plurality of longitudinally extending grooves or scoops opening into the throat or fluid-passage in the interior of the flow tube, which longitudinally extending scoops communicate with pressure-sampling bores or ports in the tube. Two sets of longitudinal scoops and communicating pressure ports are provided; said sets facing in opposite directions in the throat of the flow tube.

Another feature comprises the provision of square impact surfaces at the ends of said longitudinal scoops, adjacent the open ends of the communicating pressure ports.

Due to said scoops the pressure differential is substantially increased between the respective groups of pressure ports. The square impact surfaces at the ends of said scoops are particularly effective in contributing to the increased differential pressure.

Other features of the invention will be hereinafter described and claimed.

In the accompanying drawings:

Fig. 1 is a view in end elevation of a flow tube embodying my invention.

Fig. 2 is a vertical sectional view, taken on line 2—2 of Fig. 1.

Fig. 3 is a vertical sectional view on line 3—3 of Fig. 1.

Fig. 5 is a view in vertical section, taken on lines 5—5 of Fig. 4.

Fig. 7 is a detail sectional view, on a scale enlarged with respect to the preceding views, illustrating the port and scoop arrangement in a

Figure 4:
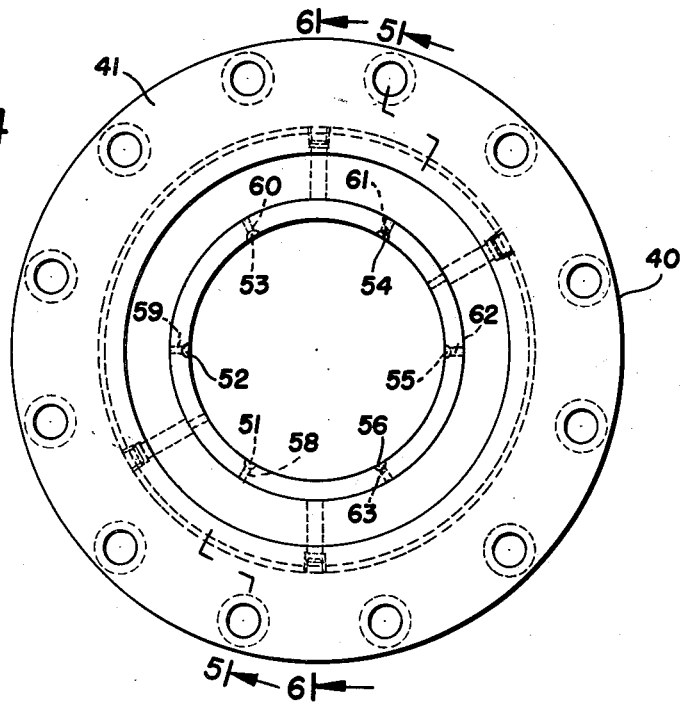
Fig. 4 is an end elevational view of a modified embodiment of the invention.

2 flow-tube liner, and also illustrating how the liner may be produced from a tubular blank.

Referring to the embodiment illustrated in Figs. 1, 2, and 3, a flow tube 5 is provided of any suitable length and diameter, having flanged terminal portions 6 and 7. Said terminal portions have holes 8 for receiving bolts to fasten the tube securely to flanges of adjacent pipe sections, as will be apparent.

The interior of the tube 5 provides a throat or flow passage 9, which preferably curves uniformly inwardly from one end to the center of said passage, and uniformly outwardly from the center to the other end. Thus said passage decreases in cross-section from each end to the center.

The inner surface of the tube 5 is formed with longitudinal grooves or scoops 10, 11, 12, 13, 14, and 15. These scoops are open to the flow passage 9 throughout their lengths, as shown. At one end, each of the scoops has a square or abrupt edge 16. At its opposite end, each scoop is terminated by the curvature of the inner surface of the flow tube, so that said opposite end opens directly into an outwardly flared portion of the curved flow passage 9.

The scoops 10, 12, and 14 are shown extending from the center of the passage 9 toward one end of said passage; while scoops 11, 13, and 15 are shown extending from the center of said passage 9 towards the other end. Pressure ports 17, 18, 19, 20, 21, and 22 communicate with the respective scoops adjacent the square ends 16, as shown. The ports 17, 19, and 21 also communicate with an annular chamber or manifold 23, cut into one end of the tube 5; while ports 18, 20, and 22 communicate with an annular chamber or manifold 24 cut into the other end of said tube. The manifold 23 and 24 may conveniently be closed by annular plates 25 and 26, respectively, suitably secured to the corresponding ends of the flow tube 5.

The square or abrupt ends 16 of the scoops 10–15, inclusive, are preferably in a common plane normal to the central longitudinal axis of the throat or passage 9. Thus the ports 17–22 open into said scoops substantially in said plane.

Ports 27 and 28 in the flow tube communicate with the respective annular chambers or manifolds 23 and 24. These ports communicate through pipes 29, 30 with any suitable manometer or other instrument (such as shown in my copending application Serial No. 734,785, filed March 14, 1947, which matured into Patent Number 2,573,430 on October 30, 1951) responsive to the difference between the pressures in said manifolds 23 and 24.

In the measurement of the velocity or quantity rate of flow of a fluid flowing through the throat 9, the pressures impressed on the upstream ports will comprise the static head, plus dynamic and viscosity forces proportional to the square of the velocity.

More particularly, pressures due to dynamic impact are produced by the flowing fluid upon the fluid in the ports facing upstream. The square formation of the scoop shoulders 16 facilitates the application of these dynamic impact forces. In addition, due to the fact that the scoops extend along the inner wall surface of the throat 9, viscosity forces are imparted to the fluid in the said ports. As is pointed out in my aforementioned application Serial No. 734,785, the viscosity effect, or resistance of a layer of fluid along the internal wall of a closed conduit, varies as $V^2$, where V is the mean stream velocity. Likewise, the dynamic impact forces are proportional to $V^2$.

Assuming, for example, that the flow is from left to right, the total head impressed upon the group of ports 18, 20, and 22, through the scoops 11, 13, and 15, is the sum of the static head in the system and some quantity proportional to the velocity head. In other words $$H_1 = h + C_1 \frac{V^2}{2g}$$

in which $H_1$ is the total head, $h$ the static head, $C_1$ a calibration constant, and $$\frac{V^2}{2g}$$

the velocity head.

Concurrently, the total head impressed upon the downstream-directed ports 17, 19, and 21, through the scoops 10, 12, and 14 will be equal to the static head minus some quantity proportional to the velocity head. The total head $H_2$ impressed upon said downstream ports may thus be expressed as follows:

$$H_2 = h - C'' \frac{V^2}{2g}$$

$C''$ being also a calibration constant.

The differential head available in the manifolds 23, 24 for flow measurement may thus be expressed as $$H_1 - H_2 = (C' + C'') \frac{V^2}{2g}$$

It will thus be seen that differential pressures are produced in the manifolds 23, 24, which are proportional to the velocity head; and that by suitable calibration these differentials may be converted to read in any desired units of flow, either in terms of average velocity or quantity flowing per unit of time.

The manifolds 23, 24 may, as shown, be provided with drain ports 32, 33, normally closed by threaded plugs 34, 35. Also, ports 36, 37 may be drilled through the tube, for communication with a manometer or the like, whenever measurement of the static pressure in the throat 9 may be desired. Normally, said ports 36, 37 are closed by plugs 38, 39.

In the embodiment illustrated in Figs. 4–7, the flow tube 40, like the previously described tube 5, has flanged terminal portions designated 41 and 42. Said terminal portions have holes 43 for receiving bolts to fasten the tube securely to flanges of adjacent pipe sections.

The interior of the tube provides a flow passage 44 having walls 45 and 46 curved inwardly from opposite ends of the tube. Between said curved walls 45 and 46 the inner surface 47 of the tube is of cylindrical formation. Into said cylindrical portion of the tube there is securely fitted a liner 48, the outer surface of which is cylindrical. The interior surface of said liner curves inwardly at 49 from the tube wall 45 to the central plane of the liner, and thence curves outwardly at 50 from said central plane to the tube wall 46.

The interior surface of the liner 48 is formed with longitudinal grooves or scoops 51, 52, 53, 54, 55, and 56. These scoops are open to the flow passage 44 throughout their lengths as shown. At one end, each of the scoops has a square edge 57. At its opposite end, each scoop is terminated by the curvature of the inner surface of the liner, so that said opposite end opens directly into an outwardly flared portion of the curved flow passage 44.

The scoops 51, 53, and 55 are shown extending from the center of the passage 44 toward one end of said passage; while scoops 52, 54, and 56 are shown extending from the center of said passage 44 toward the other end. Pressure ports 58, 59, 60, 61, 62, and 63 communicate with the respective scoops adjacent the square ends 57, as shown. The ports 58, 60, and 62 also communicate with an annular recess or manifold 64 cut into the cylindrical outer face of the liner 48; while ports 59, 61, and 63 communicate with an annular recess or manifold 65 in said outer liner face.

Ports 66 and 67 in the flow tube 40 communicate with the respective manifolds 64 and 65. These ports also communicate through pipes 68 and 69 with any suitable manometer or other instrument responsive to the difference between the pressures in said manifolds.

The square ends 57 of the scoops 51–56, inclusive, are preferably in a common plane normal to the central longitudinal axis of the throat or passage 44. Thus the ports 58–63 open into said scoops substantially in said plane.

The manifolds 64, 65 are shown provided with drain ports 70, 71, normally closed by threaded plugs 72, 73. Also, ports 74, 75 may be drilled through the liner 48, as shown, and may communicate with ports 76, 77, which are drilled through the flow tube, for attachment to a manometer or the like, whenever measurement of the static pressure in the throat or passage 44 may be desired. Normally, said ports 76, 77 are closed by plugs 78 and 79.

Figure 6:
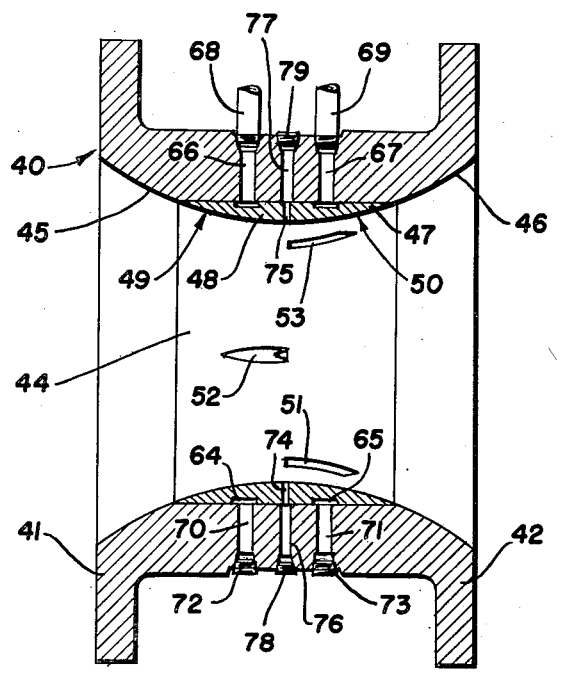
Fig. 6 is a view in vertical section on line 6—6 of Fig. 4.

As in the embodiment shown in Figs. 1–3, the differential pressure developed in the manifolds 64, 65 of Figs. 4–6 will be proportional to the square of the velocity of the fluid flowing in the passage 44. By suitable calibration of the manometer or metering apparatus, this differential may be converted to read in any desired units of flow, either in terms of average velocity or quantity flowing per unit of time.

The scoops 51–56, inclusive, may conveniently be formed (as shown in Fig. 7) by drilling holes 80 in a tubular liner blank 48'. Thereafter, in the machining of the blank to form the curved throat surfaces 49 and 50, the scoops are exposed at said surfaces in substantially semi-circular cross-section. The scoops 10–15 in the embodiment shown in Figs. 1–3 may be formed in similar manner, i. e., by drilling holes in a tubular stock or blank and thereafter exposing the scoops at the curved throat surfaces when the latter are formed by machining the blank. The drilling of the holes also readily provides at their ends the aforementioned shoulders which form the ends of the scoops at the juncture of the respective ports. The latter may be drilled in any suitable or convenient manner to connect the scoops with the manifolds. The liner 44 provides an especially compact unit of scoops, ports, and manifolds, capable of simple and economical production, and readily insertible into a flow-measuring tube.

It will be readily apparent that the illustrative embodiments of my invention above described provide efficient, compact, flexible, and economical means for producing a differential pressure in either direction, which may be employed to indicate, record, or regulate the flow of a fluid.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus of the character described, a conduit having a curved interior throat for the passage of a fluid, said throat being curved inwardly from opposite ends toward the center thereof, two groups of circumferentially spaced scoops within said conduit, said scoops comprising open recesses in the wall of said passage, the scoops in one of said groups extending in the opposite direction to those in the other of said groups, each scoop being terminated at one end by the curvature of the throat passage so that said scoop end opens directly into an outwardly flared portion of said passage, each scoop being terminated at its opposite end by a square shoulder, the shoulders of all of said scoops lying substantially in a common plane, and pressure-transmitting means comprising sets of ports communicating with the respective groups of scoops.

2. In apparatus of the character described, a conduit having a curved interior throat for the passage of a fluid, said throat being curved inwardly from opposite ends toward the center thereof, two groups of circumferentially spaced scoops within said conduit, said scoops comprising open recesses in the wall of said passage, the scoops in one of said groups extending in the opposite direction to those in the other of said groups, each scoop being terminated at one end by the curvature of the throat passage so that said scoop end opens directly into an outwardly flared portion of said passage, each scoop being terminated at its opposite end by a square shoulder, the shoulders of all of said scoops lying substantially in a common plane in the central region of said throat and normal to the longitudinal axis of said throat, and pressure-transmitting means comprising sets of ports communicating with the respective groups of scoops.

3. In apparatus of the character described, a conduit having a curved interior throat for the passage of a fluid, said throat being curved inwardly from opposite ends toward the center thereof, two groups of circumferentially spaced scoops within said conduit, said scoops comprising open recesses in the wall of said passage, the scoops in one of said groups extending in the opposite direction to those in the other of said groups, each scoop being terminated at one end by the curvature of the throat passage so that said scoop end opens directly into an outwardly flared portion of said passage, each scoop being terminated at its opposite end by a square shoulder, the shoulders of all of said scoops lying substantially in a common plane, pressure-transmitting means comprising sets of ports communicating with the respective groups of scoops, and pressure receiving means comprising manifolds communicating with the respective sets of ports.

4. In apparatus of the character described, a single-piece conduit having a fluid passage, two groups of circumferentially spaced scoops within said conduit, said scoops comprising open recesses in the wall of said passage, the scoops in one of said groups extending in the opposite direction from those in the other of said groups, said conduit having a pair of annular recesses in opposite end surfaces thereof forming pressure-receiving manifolds, closure means at the ends of said conduit for covering said recesses, pressure-transmitting means comprising a set of ports extending in one direction in said conduit for connecting the scoops of one of said groups with one of said recesses, and pressure-transmitting means comprising another set of ports extending in the opposite direction in said conduit for connecting the scoops of the other of said groups with the other of said recesses.

5. Apparatus as defined by claim 1 wherein the throat of said conduit includes a liner curved inwardly from opposite ends toward the center and containing said scoops and ports.

VINCENT GENTILE, Jr.

REFERENCES CITED

The following references are of record in the file of this patent:

UNITED STATES PATENTS

| Number | Name | Date |
| --- | --- | --- |
| 1,185,180 | Close | May 30, 1916 |
| 1,698,314 | Mapelsden | Jan. 8, 1929 |
| 1,946,319 | Hodgson et al. | Feb. 6, 1934 |
| 2,105,967 | Burdsal et al. | Jan. 18, 1938 |
| 2,573,430 | Gentile, Jr., | Oct. 30, 1951 |

FOREIGN PATENTS

| Number | Country | Date |
| --- | --- | --- |
| 196,134 | Great Britain | Apr. 19, 1923 |
| 232,867 | Germany | Mar. 24, 1911 |
| 296,946 | Germany | Mar. 12, 1917 |

OTHER REFERENCES

5. Apparatus as defined by claim 1 wherein the ogene, at page 23 in Mesures and Controle Industriel, vol. 14, No. 140, published January 1949 at 79, Avenue des Champs-Elysees, Paris VIII, France.